US011925591B1

(12) United States Patent
Cohen

(10) Patent No.: US 11,925,591 B1
(45) Date of Patent: Mar. 12, 2024

(54) THERAPEUTIC DEVICE TO ASSIST POSTURE

(71) Applicant: Michael A. Cohen, Toronto (CA)

(72) Inventor: Michael A. Cohen, Toronto (CA)

( * ) Notice: Subject to any disclaimer, the term of this patent is extended or adjusted under 35 U.S.C. 154(b) by 711 days.

(21) Appl. No.: 17/126,568

(22) Filed: Dec. 18, 2020

Related U.S. Application Data

(60) Provisional application No. 62/949,618, filed on Dec. 18, 2019.

(51) Int. Cl.
*A61H 1/02* (2006.01)
*A61H 39/04* (2006.01)

(52) U.S. Cl.
CPC .......... *A61H 1/0292* (2013.01); *A61H 39/04* (2013.01); *A61H 2201/0207* (2013.01); *A61H 2201/0257* (2013.01); *A61H 2201/1253* (2013.01); *A61H 2201/1623* (2013.01); *A61H 2201/1645* (2013.01); *A61H 2201/1695* (2013.01)

(58) Field of Classification Search
CPC ...... A61H 1/02; A61H 1/0218; A61H 1/0292; A61H 1/0296; A61H 7/00; A61H 7/001; A61H 2201/02; A61H 2201/0207; A61H 2201/0221; A61H 2201/0257; A61H 2201/12; A61H 2201/1253; A61H 2201/16; A61H 2201/1602; A61H 2201/1623; A61H 2201/1645; A61H 2201/169; A61H 2201/1695; A61H 39/00; A61H 39/04; A61H 9/00–0092; A47G 9/10–109
See application file for complete search history.

(56) References Cited

U.S. PATENT DOCUMENTS

2005/0049123 A1* 3/2005 Dalebout .......... A63B 21/0552
482/142
2018/0140117 A1* 5/2018 Chung .................. A61H 39/04

FOREIGN PATENT DOCUMENTS

KR 200195301 Y1 * 9/2000
KR 200325564 Y1 * 9/2003
KR 20060110419 A * 10/2006
KR 20120004350 A * 1/2012
KR 20160129533 A * 11/2016
WO WO-2006133478 A1 * 12/2006 ............ A61H 39/04
WO WO-2017024267 A1 * 2/2017 ............ A61H 15/00

* cited by examiner

*Primary Examiner* — Michelle J Lee
(74) *Attorney, Agent, or Firm* — Colin P. Abrahams

(57) ABSTRACT

A therapeutic device comprises an upper massage surface having a generally central spinous channel, a first domed portion on a first lateral side of the central spinous channel and a second domed portion on a second lateral side of the central spinous channel. The device has a lower base surface, a front edge, and a rear edge, with the upper massage surface extending between front edge and the rear edge. The device further has a first lateral edge on one side of the therapeutic device and a second lateral edge on an opposing side of the therapeutic device, such that the distance between the first and second lateral edges is greater than the distance between the front edge and the rear edge.

18 Claims, 5 Drawing Sheets

THERAPEUTIC DEVICE TO ASSIST POSTURE

CROSS REFERENCE TO RELATED APPLICATIONS

This application claims the benefit of U.S. Provisional Patent Application No. 62/949,618 filed Dec. 18, 2019, the contents of which are incorporated herein by reference in their entirety.

FIELD AND BACKGROUND OF THE INVENTION

This invention relates to a therapeutic device. More particularly, the invention is for a therapeutic device having shapes and contours which are configured to massage the body of a person. In one particular form of the invention, the therapeutic device is constructed so as to facilitate or assist in the improvement of the posture of the user. The therapeutic device can be placed relative to the user while the user is in a sitting position or in some other related suitable and appropriate position, to guide posture, or it may be used when the user is lying down or any other intermediate position.

SUMMARY OF THE INVENTION

According to one aspect of the invention, there is provided a therapeutic device comprising: an upper massage surface having a generally central spinous channel, a first domed portion on a first lateral side of the central spinous channel and a second domed portion on a second lateral side of the central spinous channel; a lower base surface; a front edge; a rear edge, the upper massage surface extending between front edge and the rear edge; a first lateral edge on one side of the therapeutic device and a second lateral edge on an opposing side of the therapeutic device, wherein the distance between the first and second lateral edges is greater than the distance between the front edge and the rear edge.

In one embodiment, the first domed portion comprises an outer curved surface and a plurality of projections extending upwardly and outwardly from the outer curved surface. The first domed portion may have a circumferential edge at its base, the circumferential edge being adjacent the central spinous channel. The first domed portion may have a diameter which is about one fourth, or one third, of the distance between front edge and the rear edge. Preferably, the first domed portion is located on the upper massage surface adjacent the rear edge. The first domed portion may be adjacent the central spinous channel and the rear edge, and about equidistant from each of the central spinous channel and the rear edge respectively.

A projections may extend outwardly from the outer curved surface of the first domed portion and each may have a base, a cylindrical shaft portion and a rounded end, each cylindrical shaft portion of the projections having an axis which is about normal to the outer curved surface where the base attaches to the outer curved surface. The rounded ends of the projections together may define an arcuate configuration with spaces therebetween.

Preferably, the therapeutic device has an upper massage surface which is rounded and has a generally central apex, and the apex and the lower base surface define a distance between them which is about half the distance between the front edge and the rear edge, the distance facilitating the placement of the therapeutic device comfortably between the back of the user and a seating surface behind the back of the user.

In one embodiment, a plurality of large projections are formed on the upper massage surface on each side of the central spinous channel, the plurality of large projections being positioned on the upper massage surface at the periphery thereof, and extending from along the central spinous channel, to the front edge, the first or second lateral side respectively and the rear edge. The plurality of large projections may define an internal surface area and the therapeutic device further comprises a plurality of small projections formed in the internal surface area. The large projections and the small projection may each have a base, a cylindrical shaft and a hemispherical end portion.

There may also be a plurality of flat semicircular projections on the upper massage surface positioned adjacent the central spinous channel and front edge and bounded by the large projections. These may have opposing flat planar surfaces wherein respectively one of the opposing flat planar surfaces faces the front edge and the other of the flat planar surfaces face the rear edge. The lower base surface may be textured or treated to provide it with frictional capacity to reduce shifting or sliding when in use.

The therapeutic device may be comprised of a material which can be heated and which is able to maintain heat. The therapeutic device may have an interior with a fill material in the interior of the device which is heatable and which is able to maintain heat.

According to another aspect of the invention, there is provided a method of forming a therapeutic device comprising: providing an upper massage surface having a generally central spinous channel, a first domed portion on a first lateral side of the central spinous channel and a second domed portion on a second lateral side of the central spinous channel; providing a lower base surface; providing a front edge; providing a rear edge, the upper massage surface extending between front edge and the rear edge; providing a first lateral edge on one side of the therapeutic device and a second lateral edge on an opposing side of the therapeutic device, wherein the distance between the first and second lateral edges is greater than the distance between the front edge and the rear edge.

According to yet another aspect of the invention, there is provided a method of massaging using a therapeutic device comprising: providing an upper massage surface having a generally central spinous channel, a first domed portion on a first lateral side of the central spinous channel and a second domed portion on a second lateral side of the central spinous channel, the upper massage surface being applied to the body of the user with the central spinous channel accommodating the spine of the user; forming a lower base surface with frictional capacity to reduce sliding on a surface; providing a front edge; providing a rear edge, the upper massage surface extending between front edge and the rear edge; providing a first lateral edge on one side of the therapeutic device and a second lateral edge on an opposing side of the therapeutic device which are away from the spine of the user, and wherein the distance between the first and second lateral edges is greater than the distance between the front edge and the rear edge so that the therapeutic device can fit suitable between the back of the user and a seating surface on which the user is positioned; and heating the therapeutic device to a temperature to enhance the therapeutic effect.

In one aspect, the therapeutic device of the invention is therefore designed so as to preferably have the minimal possible size in order to provide proper postural support for the back of the user during sitting, or when in the sitting position, to re-create or encourage normal upright spinal posture, or to guide the user toward sitting in such a normal upright position. This is practically important in today's society where many computer user's, or other sedentary workers, tend to slouch or slump forward when interacting with their computer or workspace. This may have the effect of causing a deleterious load on the joints, discs and muscles of the spine, and may further cause organ compression such as in the front of the body which has been linked to, amongst other possible ailments, increased rates of colon pathology and decreased respiratory capacity.

In one aspect of the invention, it is intended that the therapeutic device be placed on the chair or other seating apparatus on which the user is sitting, preferably behind the back of the user and located anywhere along the length of the spine. One preferred position for the therapeutic device of the invention would be near the lower part of the spine, or at the lower back, although the device is not confined to such a position in order to be useful and have the desired therapeutic effect.

The therapeutic device of the invention is shaped and has a surface configuration which may include some or all of the structures and features described below.

(1) The therapeutic device of the invention preferably comprises a central, or somewhat generally centered, recessed groove or channel to accommodate the user's spine while in the sitting position. This recessed groove has the advantage of creating a much more ergonomically beneficial device for the end user, as it positions the user's spine in a more neutral spinal posture thereby reducing the load on the muscles, joints and discs. This in turn helps to facilitate improved spinal health, and further may be able to provide extra comfort for the end user.

(2) The therapeutic device of the invention is preferably one which is heatable, so as to calm the nervous system of the user, and relax muscles and connective tissue which tend to tighten when sitting over periods of time. This may be accomplished, according to one aspect of the invention, by placing the device in a microwave for 90 seconds or boiling for about 12 minutes to create about 2 hours of continuous heat at about 100-102 degrees F. Note that the heating times provided above are examples only, and any suitable time according to the situation and requirements would fall within the scope of the invention. Further, differently sized therapeutic devices, which may also be differently configured, may result in different time periods of continuous or sustained heat in which they remain optimal or at least effective to provide the desired therapeutic results.

(3) The therapeutic device of the invention preferably incorporates two hemispheric or rounded structures on either side of the central recessed spinal groove. These hemispheric or rounded structures are each preferably designed with about up to a 180 degrees array of acupressure points to specifically provide an acupressure relaxation effect on, for example, the erector spinae muscles on either side of the spine. These are the muscles that bear the majority of the load when the user is in the sitting position, which causes them to tighten.

(4) The therapeutic device of the invention may further comprise a specific nib configuration, whereby these nibs or projections which extend outwardly from the surface of the device aim inward, for example at a 20 degree angle, on either side of the central recessed spinal groove. This specific configuration thereby preferably creates an acupressure effect on the portion of the erector spinae muscles directly adjacent to the spine. However, variations in the size of these nibs, as well as their angles relative to the surface of the therapeutic device as well as the recessed groove, would certainly fall within the scope of the invention, and these may be selected based on the shape and configuration of the therapeutic device, its size, its optimal intended location, nature of the interaction with the user, and such other parameters that may help to determine their position and orientation.

(5) In one embodiment, the therapeutic device of the invention may comprise a specific two stage nib configuration (such as, for example, smaller and larger) on either side of the central recessed spinal groove. Such a configuration would help to create an acupressure effect on the mid and outer aspects of the erector spinae muscles. Furthermore, the invention also contemplates a multitude of different nib or projection sizes and configurations device, and wherein each of the different nib or projection sizes may be strategically located on the surface so as to potentially coincide with muscles or skin or other types of body tissue of the user which the therapeutic device will contact or have adjacent positions with. Further, the angle of the nibs or projections may differ relative to the surface of the device, and also relative to other nibs or projections which are formed on the surface of the device.

(6) The therapeutic device of the invention is preferably designed so as to accommodate the bulk of the erector spinae muscles on either side of the spine of the user with a negative hemispheric slope featuring acupressure points to release tight erector spinae muscles while delivering maximum ergonomic comfort to the user.

According to one aspect of the invention, there is therefore provided a therapeutic or massage device having a contoured and shaped operating surface, the operating surface including a recessed groove, a hemispheric or rounded structure on the operating surface on at least one side of the recessed groove, a plurality of nibs or projections formed on the hemispheric or rounded structure, and a plurality of nibs or projections which may be of varying size and shape formed on the operating surface around the hemispheric structures. Preferably, there is a hemispheric structure on each side of the recessed groove, and the hemispheric or rounded structures may be located, in one embodiment of the invention, along the recessed groove toward a top or bottom edge of the therapeutic device. In other words, the hemispheric or rounded structures may be other than centrally located along the recessed groove. There may be more than one hemispheric structure located on each side of the recessed groove, and the number and position of such hemispheric or rounded structures may be different on each side of the massage device.

In one form of the invention, some or all of the nibs or projections formed on the hemispheric structure as well as the operating surface around the hemispheric structures project outwardly from the hemispheric structure or operating surface respectively at substantially right angles to the surface from which they project, or they may be selectively angled relative to the such surface in order to potentially optimize their therapeutic effect.

DETAILED DESCRIPTION OF THE INVENTION

Figure 1:
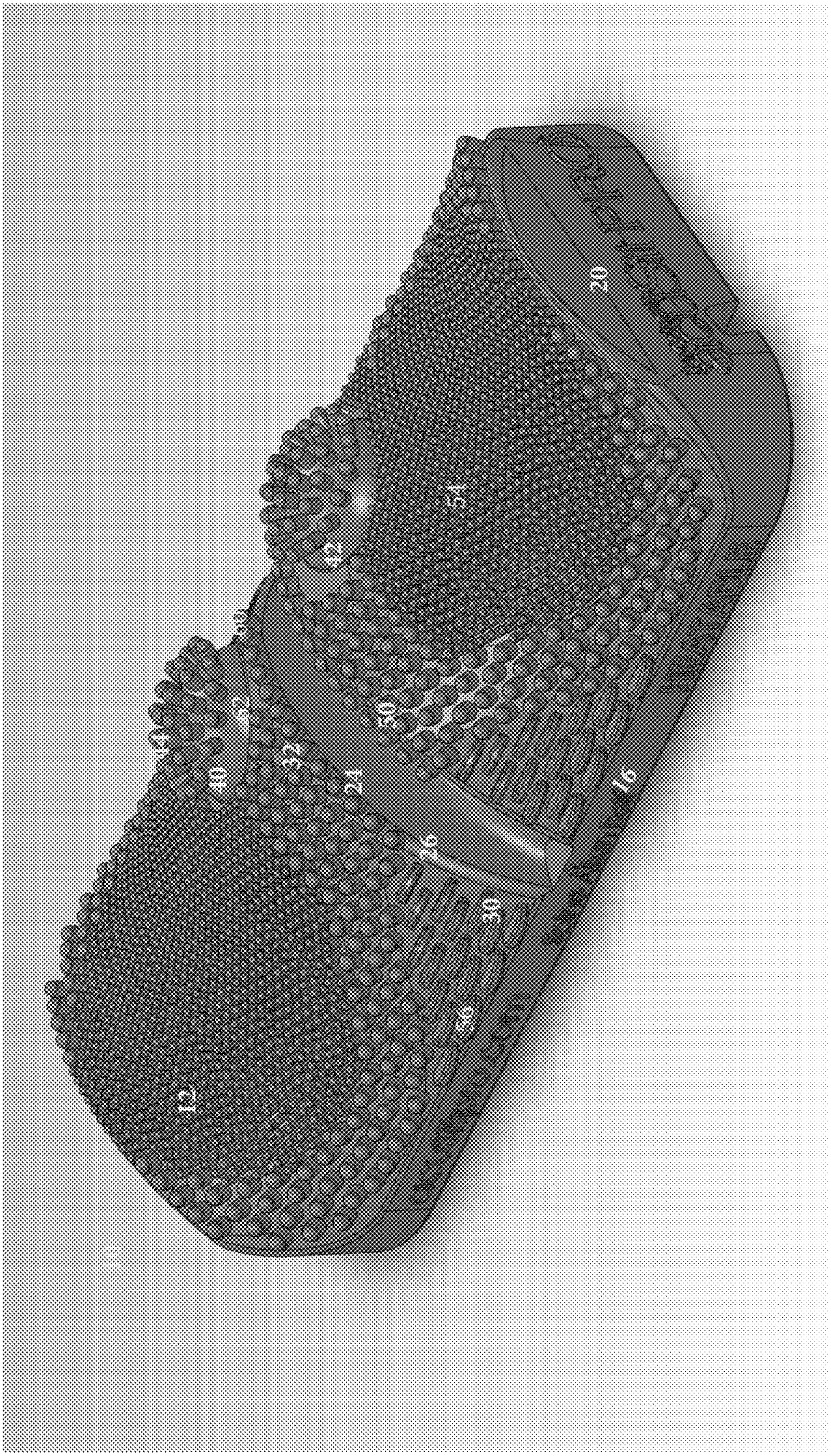
FIG. 1 is a top perspective view of a therapeutic device in accordance with one aspect of the present invention.

Reference is now made to the accompanying drawings which show an embodiment of a therapeutic device 10 in accordance with the invention. Note that the therapeutic device 10 illustrated and described herein is exemplary, and many different therapeutic devices 10 having varied shapes, configurations, surface arrangements and other structural attributes would fall within the scope of the invention.

FIGS. 1 to 5 of the drawings illustrate a therapeutic device 10. The therapeutic device 10 has a top surface 12, a bottom surface 14, a front edge 16, a rear edge 18, and side edges 20 and 22. The top surface 12 has a generally curved or rounded or arcuate surface configuration extending from the front edge 16 to the rear edge 18.

A central recessed groove 24 is formed in the generally central and transverse position across the top surface 12. The central recessed groove 24 has side walls 26 and 28, and a lip or track 30 is formed at the top of each of the side walls 26 and 28. A row of nibs or projections 32 is located on the lip or track 30, in the middle portion thereof between the front edge 16 and the rear edge 18, and in the embodiment shown in these figures, there is an absence of such nibs or projections 32 on the lip or track 30 near the front edge 16 and the rear edge 18 thereof. Other embodiments may have differently arranged projections on the lip or track 30, which may be configured in any of a multitude of permutations formed on the lip or track 30 on the top surface 12.

A pair of hemispherical structures 40 and 42 are formed on the top surface 12 of the therapeutic device 10. These hemispherical structures 40 and 42 may be spherical in shape, or they may simply have a rounded or curved or convex surface.

Whatever their precise shape, each of these hemispherical structures 40 and 42, as their name implies, is substantially dome-shaped, or has the arcuate or curved upper surface. Each of the hemispherical structures 40 and 42 has a base edge 60, and each is positioned such that the base edge 60 thereof is near or adjacent to the nibs or projections 32 on the lip or track 30. The remaining portion of the hemispherical structures 40 and 42, which is the upper surface 62, both extend in a direction away from the recessed groove 24, and towards the respective side edge 22 and side edge 20.

Each of the hemispherical structures 40 and 42 includes a plurality of projections 44 which may be in the form of nibs, and which extend outwardly and upwardly from the curved surface 62 thereof. These projections 44 are generally at or nearly at right angles to the surface portion 62 on which they are located, so that the projections 44 will not generally have parallel axes due to the curved nature of the surface 62, and will therefore extend in different directions. In other embodiments of the invention, however, it may well be that these projections 44, or at least some of them, do have parallel axes, and they may in fact be at any selected and suitable angle relative to the curved surface 62 of the hemispheric structures 40 and 42. The precise configuration can vary greatly and may be determined based on specific needs and treatment regimen.

The hemispherical structures 40 and 42 have a diameter, or distance between opposing sides or ends, which may vary and can be selected based on preferred treatment objectives. However, in accordance with one aspect of the invention, the diameter of a hemispherical structure 40 or 42 may be about one quarter or one third on the length of the top surface 12 extending between the front edge 16 and the rear edge 18. In one embodiment, the hemispherical structures 40 and 42 are nearer the rear edge 18 of the device, and may be spaced approximately equidistantly from rear edge 18 and central spinous channel 24. In other embodiments, the hemispherical structures may have diameters which can be about half the distance between the rear and front edges, or even about three quarters of this distance. Further, hemispherical structures may be placed at other locations on the top surface of the device, in different sizes, shapes and dimensions.

The domed or curved structures on the top surface need not be circular. They may be elliptical, polygonal, or of customized shape, irregular or otherwise, so that they can best engage the back of the user about the spine for optimal benefit and advantage. For example, one side may be rounded, and another side may be substantially straight, or concave.

There may be more than one hemispherical structure on each side of the central spinous channel. These hemispherical structures may be spaced along and adjacent to the central spinous channel, at various positions along its length.

The upper surface of the each hemispherical structure may be fully covered with the upwardly extending nibs or projections or only partially covered in selected configurations. Nibs or projections of different sizes and dimensions may be used on the hemispherical structures.

Figure 2:
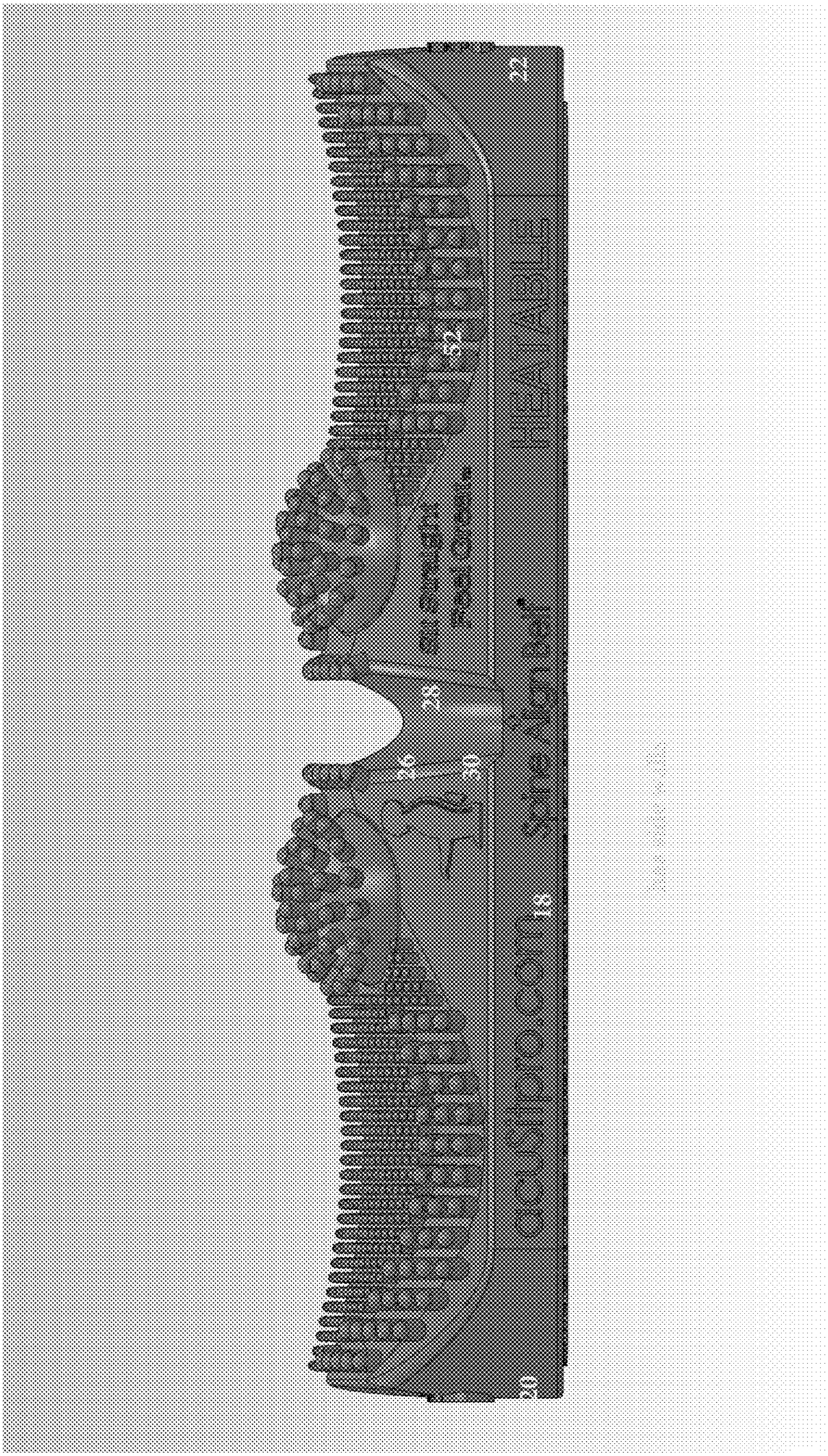
FIG. 2 is a front view of the therapeutic device shown in FIG. 1 of the drawings.
Figure 3:
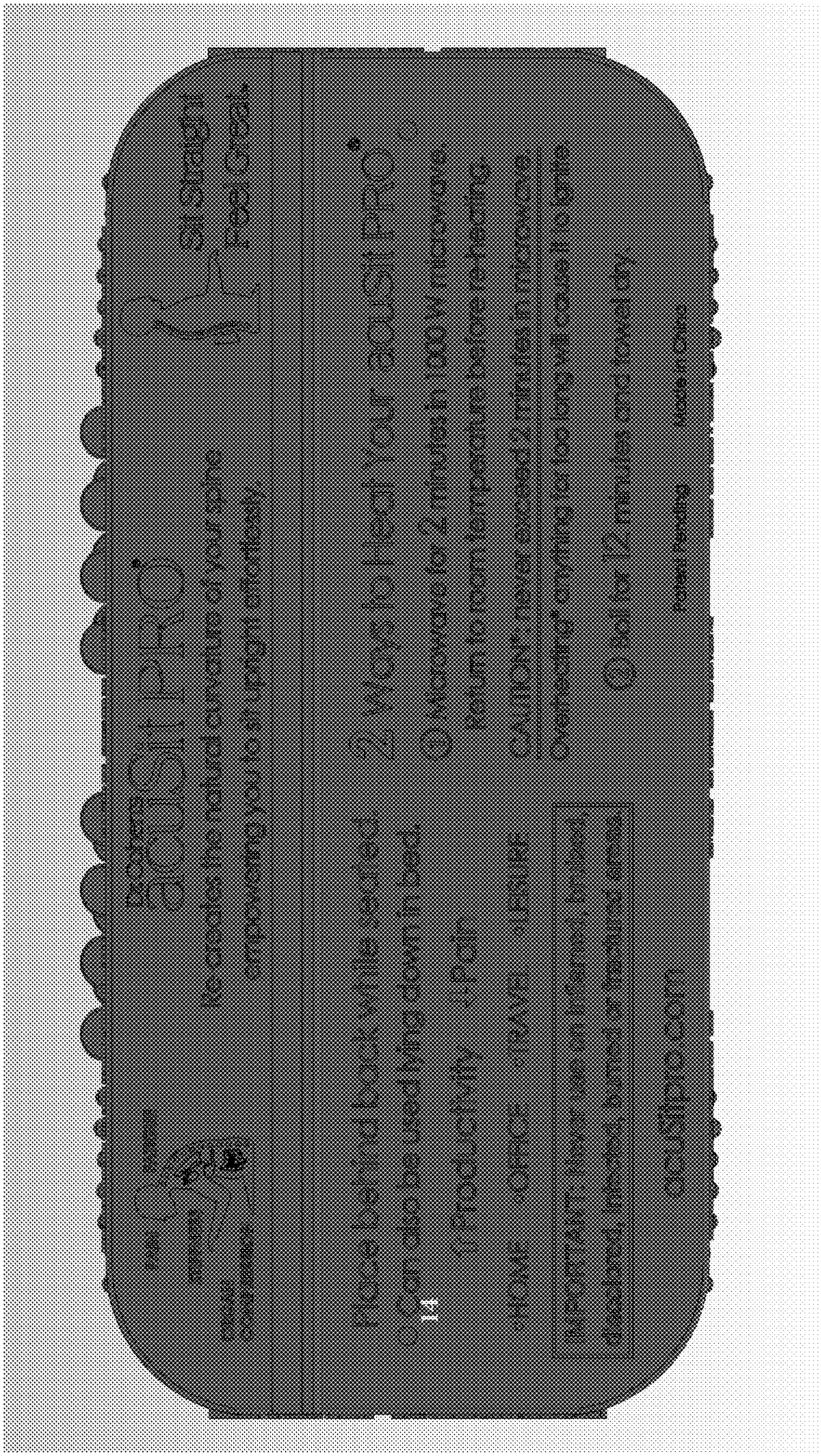
FIG. 3 is a bottom view of the therapeutic device shown in FIG. 1 of the drawings.
Figure 4:
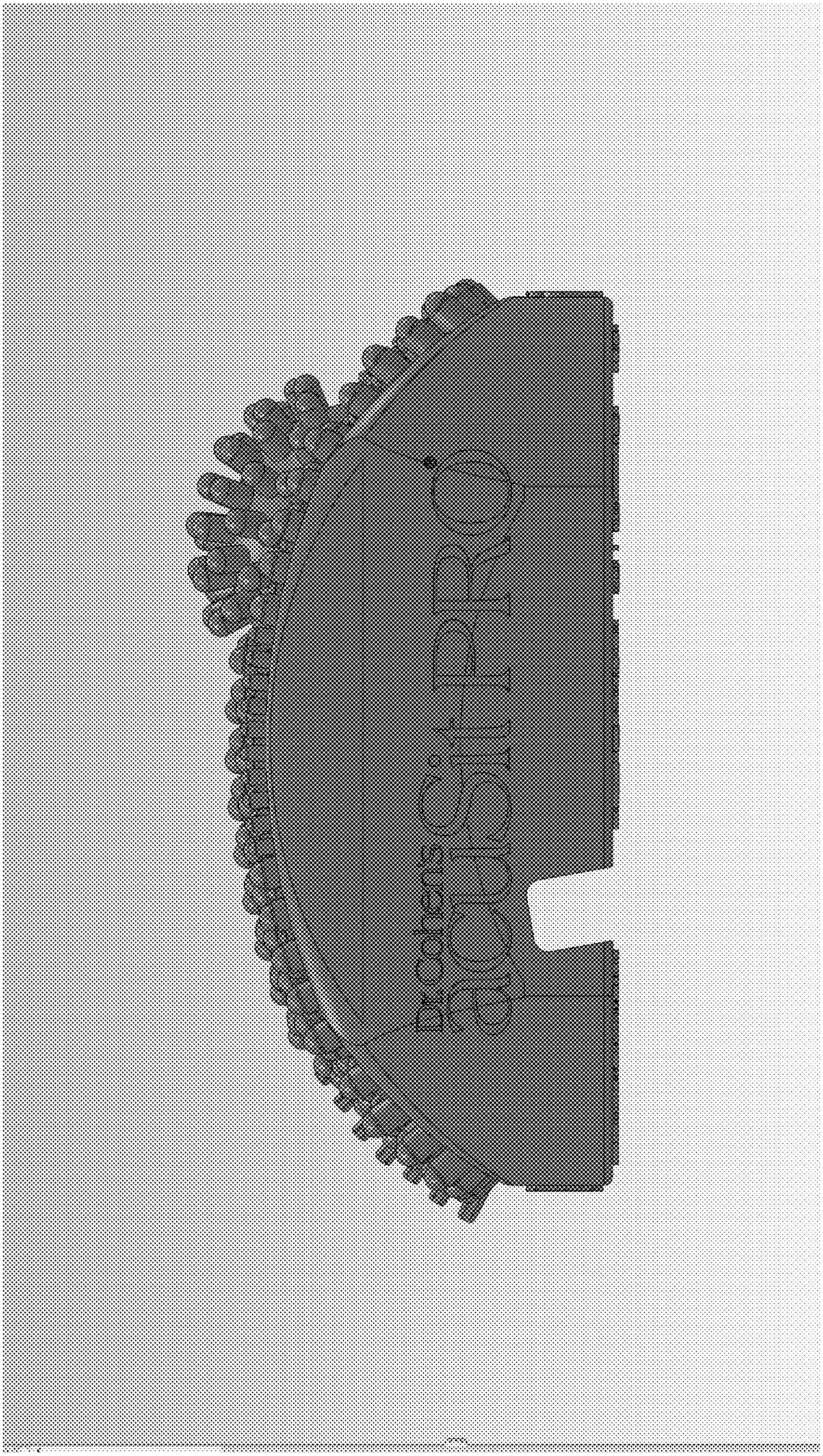
FIG. 4 is a side view of the therapeutic device shown in FIG. 1 of the drawings.
Figure 5:
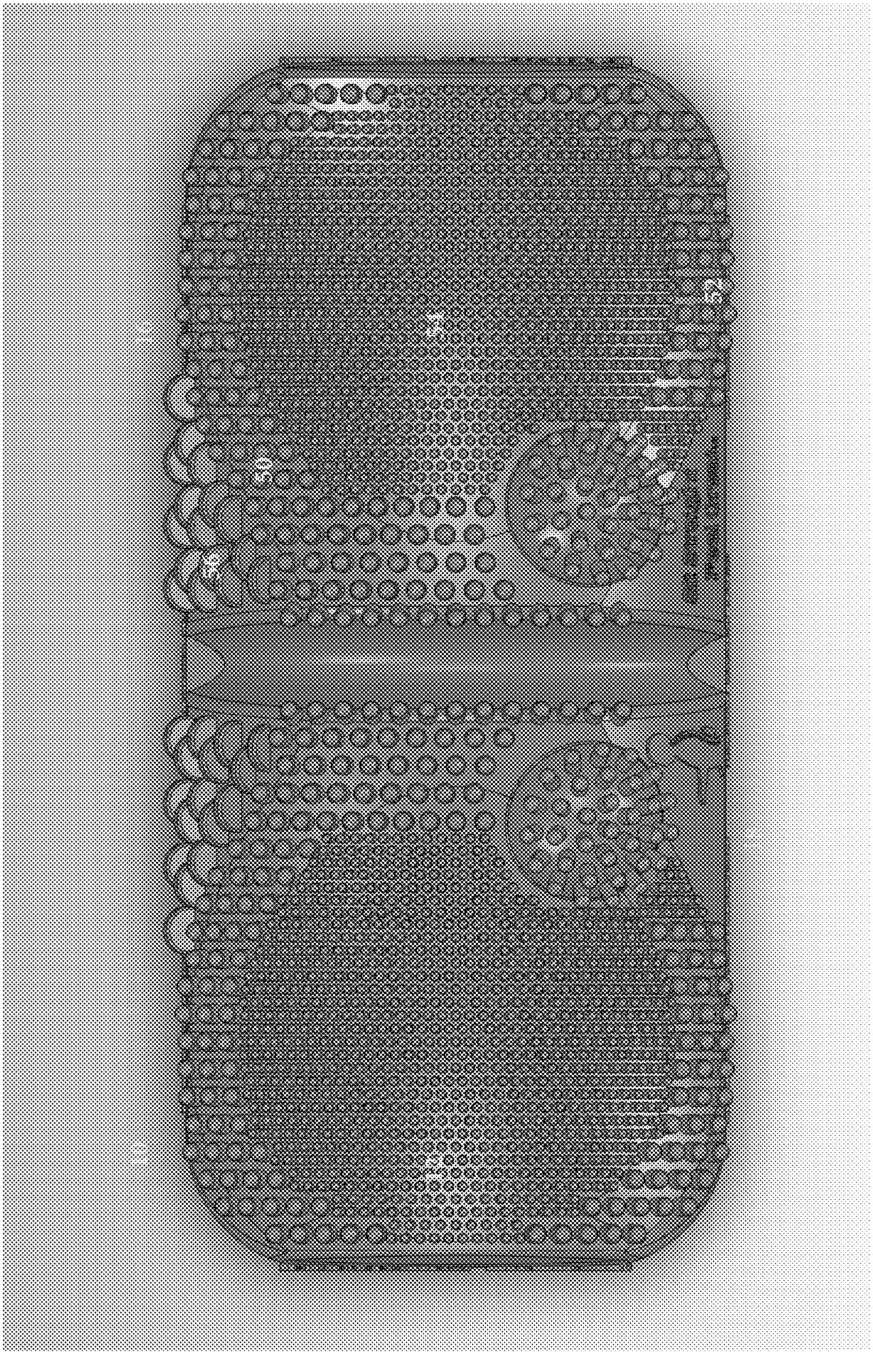
FIG. 5 is a top view of the therapeutic device shown in FIG. 1 of the drawings.

The top surface 12 has various groups of projections, and these will be substantially mirror images of each other on each side of the recessed groove 24. However, they may not necessarily be exact mirror images. Since the preferred embodiment will have mirror images, one side will be described herein, but applies to both sides. A plurality of large round projections 50, preferably arranged in rows, extend from adjacent the projections 32 on the lip 26, curve around towards the front edge 16, and curve upwardly and taper off to single line of projections 32 as they approach the edge 20. Similar shaped large round projections 52 extend around the rear edge 18, as best seen in FIG. 2 of the drawings, toward the edge 20. The arrangement of these large round projections 50 and 52 may be clearly seen in FIG. 5 of the drawings, which is a top view of the therapeutic device 10 of the invention.

In the center portion of the top surface 12, there are arranged a plurality of small projections 54, which are arranged in a series of parallel rows. These small projections 54 are not only smaller than the large round projections 50 and 52, but are also more densely packed. Also on the top surface 12, towards one edge, there are a plurality of generally flat and semicircular projections 56, best seen in the views shown in FIGS. 1 and 5 of the drawings.

As described above, the various different projections or nibs on the top surface 12 of the therapeutic device 10 are intended to massage or contact muscle, ligaments and other tissues on each side of the spine of the user. The spine of the user will therefore be accommodated in the central recessed groove 24. All, or at least some, depending upon how the therapeutic device 10 is used, of these projections 50, 52 and 54 on the top surface 12 provide acupressure points, which have the combined effect of relaxing, soothing or otherwise treating the muscles of the user, and stimulating the user by the presence of the therapeutic device 10 to adopt a posture position which may be healthier and also less likely to give rise to any adverse symptoms or pains which result from poor posturing, as discussed above. Such adverse symptoms would generally be exacerbated by long sitting sessions which can take place over an extended period.

An important feature of the therapeutic device 10 of the invention is the fact that it can be heated, and preferably retain the heat for an extended period of time. The therapeutic device 10 may be heated in that it is comprised of a material which can, for example, be placed in boiling water or placed in a microwave oven, for a given period of time to heat it. The material preferably has properties which allow it to retain heat for an extended period of time. In another form of the invention, the therapeutic device 10 may comprise one or more hollow chambers contained within it, and the hollow chambers may comprise a fill material, such as water, air, flax, to name a few, which can be heated, once more by placing the device in boiling water or in a microwave oven. The extent of heating and the temperature of the heated therapeutic device 10 may be determined based on the user's preference, or such other health factors which may be considered in selecting an appropriate temperature.

In yet a further version, the therapeutic device 10 of the invention may comprise one or more hollow chambers, heating elements within the hollow chambers, and an electrical connector at the periphery or outer surface of the device which allows the heating elements to be connected to a source of power which will heat the elements, and thus the fill material surrounding the elements. In this embodiment, the heating elements may be powered before use to heat the fill material, or the therapeutic device may in fact be connected to the source of power while in the process of being used for muscle and tissue massage, so that the fill material and the device remains at a warm temperature for the duration of the therapeutic treatment. This is useful especially if there is an extended duration for the treatment. There may be temperature sensors or timers which heat the fill material for a given period of time, or until a specific temperature is reached, and then switched off until needed to reheat once more. A uniform temperature can therefore be maintained. The invention may also comprise controls for adjusting the temperature to which the therapeutic device may be heated, since different users or different types of treatments may respond better at different temperature settings.

The device of the invention may provide acupressure points, and heat increases the blood flow and physically loosens contracted muscle, connective tissue and joints resulting in decreased pain, improved mobility and enhanced athletic performance. An overall relaxation effect may occur, sometimes within three minutes of using the device of the invention, as pain is relieved, muscular and connective tissue and joint tightness releases, and natural pain killers and sedatives may be released from the central nervous system and the heating effect soothes the individual.

In one form of the invention, the therapeutic device 10 may be used by placing it behind the back of the user while seated, although it also may be used when lying down in bed, or in a reclining or semi reclining position. It is small and easily portable, and can thus be used often unobtrusively at home, in the office, while traveling, or during leisure activities.

One preferred position for the therapeutic device 10 of the invention is to locate it at the base of the spine or at the lower back, wherein the spine is received within the recessed groove 24. The compactness and configuration of the therapeutic device 10 has the effect of causing the user to sit in a more upright position, as seen in the schematics printed or placed on the underside of the therapeutic device 10 in FIG. 3 of the drawings. The therapeutic device 10 of the invention has a flat lower or bottom surface 14 so that it will engage, such as frictionally, the back of a chair, a mattress, or other surface, and stay in the selected position without undue shifting due to gravity or the user's movements.

Positioning of the therapeutic device 10 stimulates the user to sit in a position which corresponds with, and is able to achieve more easily, the natural curvature of the spine, and to sit upright a little more effortlessly. This may help the user to reduce fatigue, any pain resulting from a person's natural tendency to slouch or crouch over, stiffness, or organ compression which is one of the consequences of a bent over posture.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A therapeutic device comprising:

an upper massage surface having a central spinous channel, a first domed portion on a first lateral side of the central spinous channel and a second domed portion on a second lateral side of the central spinous channel, wherein the first and second domed portions each comprise a circumferential edge at its base and an outer curved surface with a plurality of projections extending upwardly and outwardly from the outer curved surface;

a lower base surface;

a front edge;

a rear edge, the upper massage surface extending between the front edge and the rear edge;

a first lateral edge on one side of the therapeutic device and a second lateral edge on an opposing side of the therapeutic device, wherein a distance between the first and second lateral edges is greater than a distance between the front edge and the rear edge;

on each side of the central spinous channel, a plurality of large projections on a periphery of the upper massage surface and a plurality of small projections in an internal surface area defined by the plurality of large projections;

wherein the circumferential edges of each of the first and second domed portions intersect the periphery having the plurality of large projections and the internal surface area having the plurality of small projections on each side of the central spinous channel, respectively.

2. A therapeutic device as claimed in claim 1 wherein the plurality of large projections extend along each side of the central spinous channel, to the front edge, the first and second lateral side respectively, and the rear edge.

3. A therapeutic device as claimed in claim 2 wherein the plurality of large projections and the plurality of small projections each have a base, a cylindrical shaft and a hemispherical end portion.

4. A therapeutic device as claimed in claim 3 further comprises a plurality of flat semicircular projections on the upper massage surface positioned adjacent the central spinous channel and front edge and bounded by the plurality of large projections on each side of the central spinous channel.

5. A therapeutic device as claimed in claim 4 wherein the plurality of flat semicircular projections have opposing flat planar surfaces wherein respectively one of the opposing flat planar surfaces faces the front edge and the other of the flat planar surfaces faces the rear edge.

6. A therapeutic device as claimed in claim 1 wherein the circumferential edges are adjacent the central spinous channel.

7. A therapeutic device as claimed in claim 6 wherein the plurality of projections extending outwardly from the outer curved surface of the first domed portion each have a base, a cylindrical shaft portion and a rounded end, each cylindrical shaft portion of the plurality of projections having an axis which is about normal to the outer curved surface where the base attaches to the outer curved surface.

8. A therapeutic device as claimed in claim 7 wherein the rounded ends of the plurality of projections together define an arcuate configuration with spaces therebetween.

9. A therapeutic device as claimed in claim 6 wherein the first domed portion has a diameter which is one fourth of the distance between the front edge and the rear edge.

10. A therapeutic device as claimed in claim 6 wherein the first domed portion has a diameter which is one third of the distance between the front edge and the rear edge.

11. A therapeutic device as claimed in claim 6 wherein the first domed portion is located on the upper massage surface adjacent the rear edge.

12. A therapeutic device as claimed in claim 6 wherein the first domed portion is adjacent the central spinous channel and the rear edge, and equidistant from each of the central spinous channel and the rear edge respectively.

13. A therapeutic device as claimed in claim 1 wherein the upper massage surface is rounded and has a central apex, and the apex and the lower base surface define a distance between them which is about half the distance between the front edge and the rear edge, the distance between the apex and the lower base surface configured to facilitate placement of the therapeutic device comfortably between a back of a user and a seating surface behind the back of the user.

14. A therapeutic device as claimed in claim 1 wherein the lower base surface is textured or treated to provide it with frictional capacity to reduce shifting or sliding when in use.

15. A therapeutic device as claimed in claim 1 comprised of a material which can be heated and which is able to maintain heat.

16. A therapeutic device as claimed in claim 1 wherein the device has an interior and the device further comprises a fill material in the interior of the device which is heatable and which is able to maintain heat.

17. A method of forming a therapeutic device comprising:

providing an upper massage surface having a central spinous channel, a first domed portion on a first lateral side of the central spinous channel and a second domed portion on a second lateral side of the central spinous channel, wherein the first and second domed portions each comprise a circumferential edge at its base and an outer curved surface with a plurality of projections extending upwardly and outwardly from the outer curved surface;

providing a lower base surface;

providing a front edge;

providing a rear edge, the upper massage surface extending between the front edge and the rear edge;

providing a first lateral edge on one side of the therapeutic device and a second lateral edge on an opposing side of the therapeutic device, wherein a distance between the first and second lateral edges is greater than a distance between the front edge and the rear edge;

providing on each side of the central spinous channel, a plurality of large projections on a periphery of the upper massage surface and a plurality of small projections in an internal surface area defined by the plurality of large projections;

wherein the circumferential edges of each of the first and second domed portions intersect the periphery having the plurality of large projections and the internal surface area having the plurality of small projections on each side of the central spinous channel, respectively.

18. A method of massaging using a therapeutic device to provide a therapeutic effect comprising:

providing an upper massage surface having a central spinous channel, a first domed portion on a first lateral side of the central spinous channel and a second domed portion on a second lateral side of the central spinous channel, wherein the first and second domed portions each comprise a circumferential edge at its base and an outer curved surface with a plurality of projections extending upwardly and outwardly from the outer curved surface, the upper massage surface being applied to a body of a user with the central spinous channel accommodating the spine of the user;

forming a lower base surface with frictional capacity to reduce sliding on a surface;

providing a front edge;

providing a rear edge, the upper massage surface extending between the front edge and the rear edge;

providing a first lateral edge on one side of the therapeutic device and a second lateral edge on an opposing side of the therapeutic device which are away from the spine of the user, and wherein a distance between the first and second lateral edges is greater than a distance between the front edge and the rear edge so that the therapeutic device can fit between the back of the user and a seating surface on which the user is positioned;

providing on each side of the central spinous channel, a plurality of large projections on a periphery of the upper massage surface and a plurality of small projections in an internal surface area defined by the plurality of large projections;

wherein the circumferential edges of each of the first and second domed portions intersect the periphery having the plurality of large projections and the internal surface area having the plurality of small projections on each side of the central spinous channel, respectively; and heating the therapeutic device to a temperature to enhance the therapeutic effect.

* * * * *